March 2, 1965

J. A. MAISTROS 3,171,144

KNOCKOUT DRIVE ASSEMBLY

Filed Aug. 22, 1962

INVENTOR.
JOHN A. MAISTROS
BY
RICHEY, McNENNY & FARRINGTON
Donald W. Farrington
ATTORNEYS March 2, 1965  J. A. MAISTROS  3,171,144
KNOCKOUT DRIVE ASSEMBLY
Filed Aug. 22, 1962  5 Sheets-Sheet 4

INVENTOR.
JOHN A. MAISTROS
BY
RICHEY, McNENNY & FARRINGTON
Donald W. Farrington
ATTORNEYS INVENTOR.
JOHN A. MAISTROS
BY
RICHEY, McNENNY & FARRINGTON
Donald W. Farrington
ATTORNEYS

United States Patent Office 3,171,144
Patented Mar. 2, 1965

3,171,144
KNOCKOUT DRIVE ASSEMBLY
John A. Maistros, Tiffin, Ohio, assignor to The National Machinery Company, Tiffin, Ohio, a corporation of Ohio
Filed Aug. 22, 1962, Ser. No. 218,583
20 Claims. (Cl. 10—76)

This invention relates generally to forming machines and more particularly to an improved knockout mechanism for ejecting a workpiece from a forming die after the completion of an operation thereof.

A knockout drive assembly incorporating this invention is particularly adapted for use in automatic transfer headers and cold forming machines but is also applicable for general use in all types of forming machines requiring the ejection of a workpiece from a forming die after the completion of a working operation thereon. One preferred embodiment of this invention is illustrated in a nut forming machine wherein workpieces are progressively formed in die stations until the desired nut blank is produced. At the completion of the work stroke in each die station, the workpiece is ejected by a knockout system into transfer means which progressively position the blank at the subsequent die station until the completed blank is formed.

Generally a forming machine is intended for the manufacture of a variety of different parts by the substitution of appropriate dies at each forming station. The knockout mechanism should, therefore, be adjustable through the entire range of expected knockout strokes without changing the operated position or the knockout timing in any way which would require the modification of the associated systems such as the transfer mechanism. The knockout assembly and drive should also provide accuracy of operation and adjustment to eliminate set-up difficulties and produce uniformity of operation.

In many operations, the knockout rod or tool must carry forming loads during the working portion of the cycle. The structure is therefore constructed to prevent or minimize objectionable deflections in the elements of the system under such loads. The knockout drive provides smooth operation with acceptable accelerations throughout the range of adjustment so that the workpiece is not kicked out too hard for gripping by the transfer fingers. The drive linkage for the knockout system is also arranged to provide the high initial force necessary to break the workpiece loose from the die regardless of the position of adjustment of the mechanism.

It is an important object of this invention to provide a novel and improved knockout drive for forming machines wherein the stroke of knockout operation can be easily changed without changing the operated position of the mechanism.

It is another important object of this invention to provide a novel and improved knockout drive mechanism for forming machines wherein the stroke of operation can be changed through a substantial range without causing any substantial change in the initial force produced by the mechanism to break a workpiece loose from the dies.

It is still another object of this invention to provide a novel and improved knockout drive assembly for forming machines which can be adjusted to substantially change the knockout stroke while providing a smooth operation in all adjustment positions.

It is still another object of this invention to provide a novel and improved knockout drive assembly incorporating adjustable cam drive means which are not subject to excessive localized loads so that wear is minimized and is substantially uniform.

It is still another object of this invention to provide a novel and improved adjustable knockout rod assembly constructed and arranged so that forming forces are transmited to the machine frame at a location substantially adjacent to the forming dies.

It is still another object of this invention to provide a novel and improved knockout rod assembly which is adjustable relative to the main frame of the machine wherein forming forces are absorbed directly on the load face of the frame adjacent to the dies.

It is still another object to this invention to provide a novel and improved knockout system for forming machines which is economical to manufacture and maintain while providing ease of adjustment and dependability in operation.

Further objects and advantages will appear from the following description and drawings wherein:

FIGURE 4 is a fragmentary section taken along 4—4 of FIGURE 2 illustrating the mounting structure of the adjustable cam;

Figure 1:
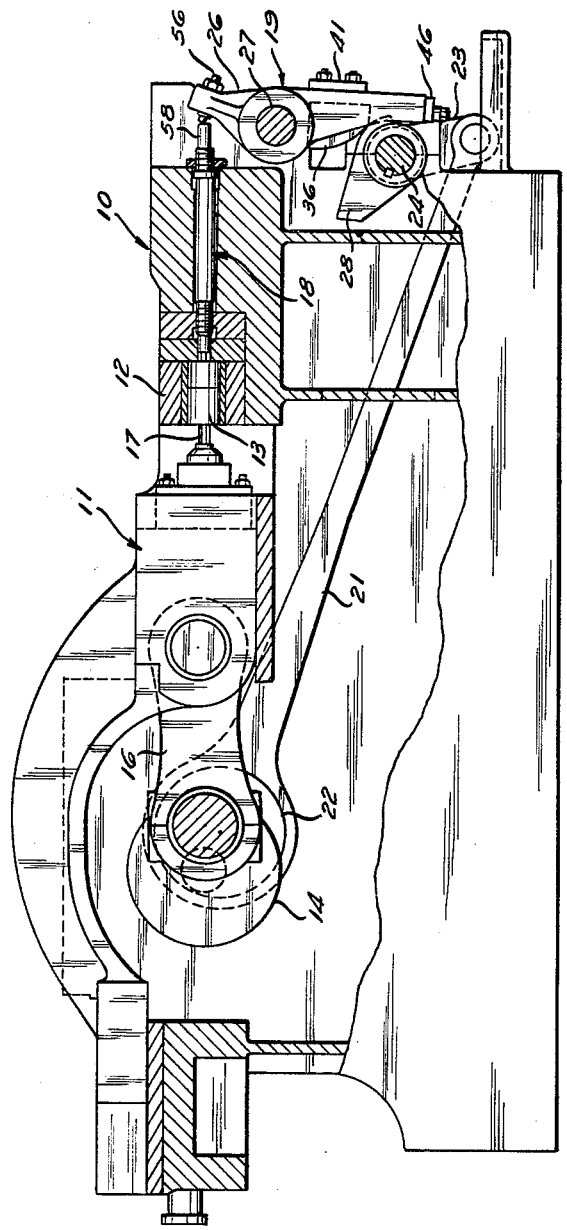
FIGURE 1 is a side elevation partially in section illustrating the basic elements of a typical forming machine incorporating a knockout assembly and drive according to this invention.

Referring to FIGURE 1, a typical forming machine of the type to which this invention is particularly suited includes a frame 10, a slide 11 reciprocable on said frame, and a die breast 12 in which die boxes 13 are mounted. The machine is provided with a plurality of die stations each of which includes a die box 13 in which workpieces are progressively formed. The slide 11 is powered by a rotating crank shaft 14 connected to the slide by a pitman 16. Tools 17 are mounted on the slide 11 at each die station to form workpieces in the dies in the die blocks 13. Transfer means (not shown) of any suitable type such as the type illustrated in the United States Patent to Clouse, No. 2,026,823, are provided to transfer the blanks progressively to each of the die stations.

The knockout mechanism operates to eject the workpiece from the dies in the die boxes 13 into the transfer mechanism after each working stroke and while the slide is spaced back from the dies. The knockout system includes two basic assemblies, the knockout rod assembly 18 and the knockout drive assembly 19.

The drive assembly 19 is powered by a drive link 21 journaled on a cam 22 mounted on the crankshaft 14 and on an arm 23 projecting laterally from a rocker shaft 24 journaled at the rearward end of the frame 10. The eccentric 22 and arm 23 are proportioned so that the rocker shaft 23 oscillates around its pivot axis through an angle of 60°.

Because the rocker shaft 24 and slide are both powered by the crankshaft 14, the timing of the oscillations of the rocker shaft 24 are automatically timed with the machine.

A rocker arm 26 is journaled on the frame 10 for oscillating rotation about a pivot shaft 27 mounted on the frame. The upper end of the rocker arm 26 engages the rearward end of the knockout rod assembly 18 and operates to push the rod assembly 18 forward to kick the workpiece out of the dies in the die box 13 at the completion of the working stroke of the slide 11.

It should be understood that even though only one rocker arm 26 and rod assembly 18 is illustrated, similar rocker arms 26 and rod assemblies 18 are provided for each die station of the machine. A single rocker shaft 24 extends across the frame and is provided with a separate cam to power each of the rocker arms 26.

Figure 2:
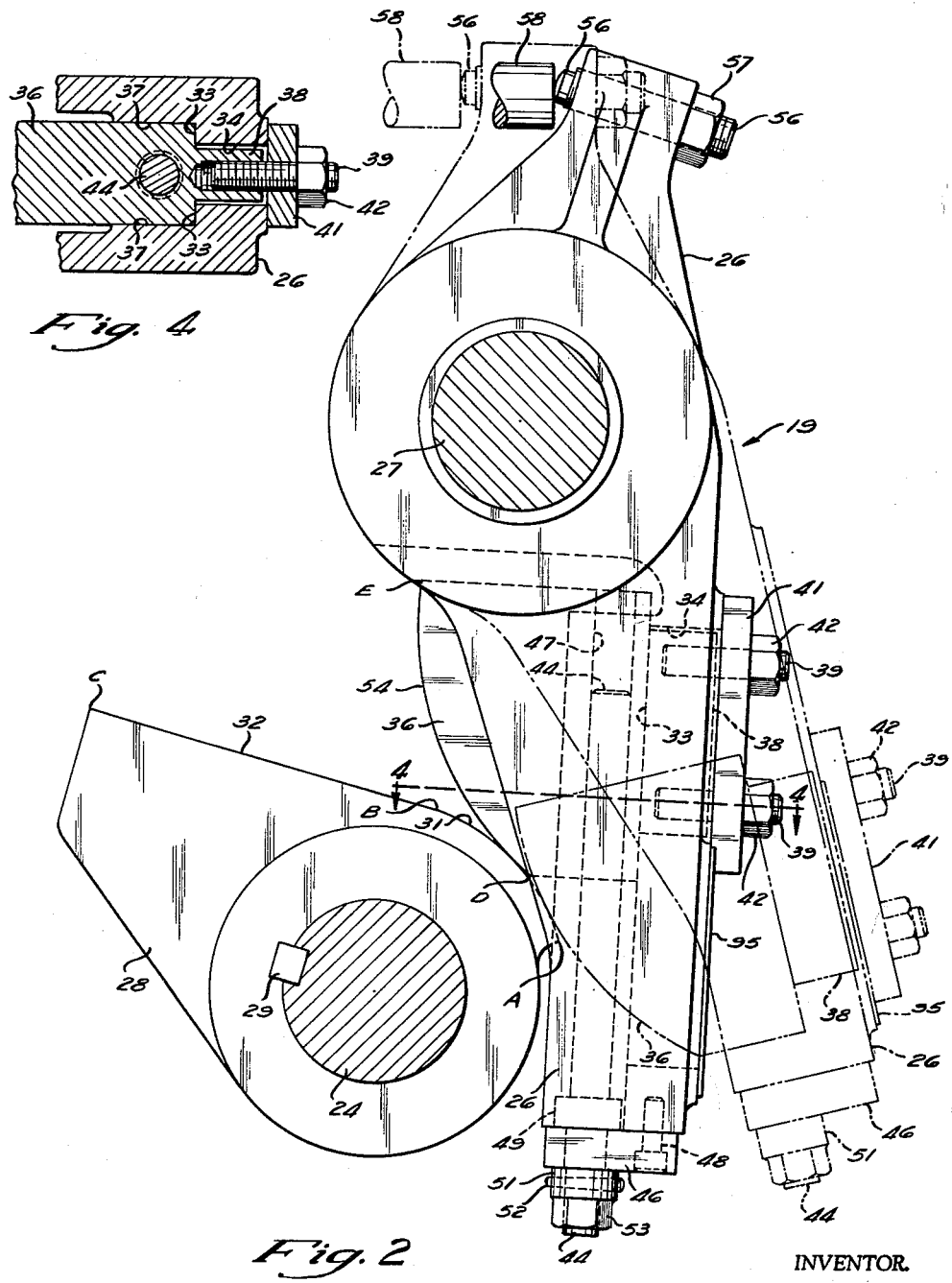
FIGURE 2 is an enlarged fragmentary section illustrating the knockout drive in the position before knockout operation showing the mechanism in full line view in the adjusted position for maximum stroke and in phantom view in another position of adjustment.
Figure 3:
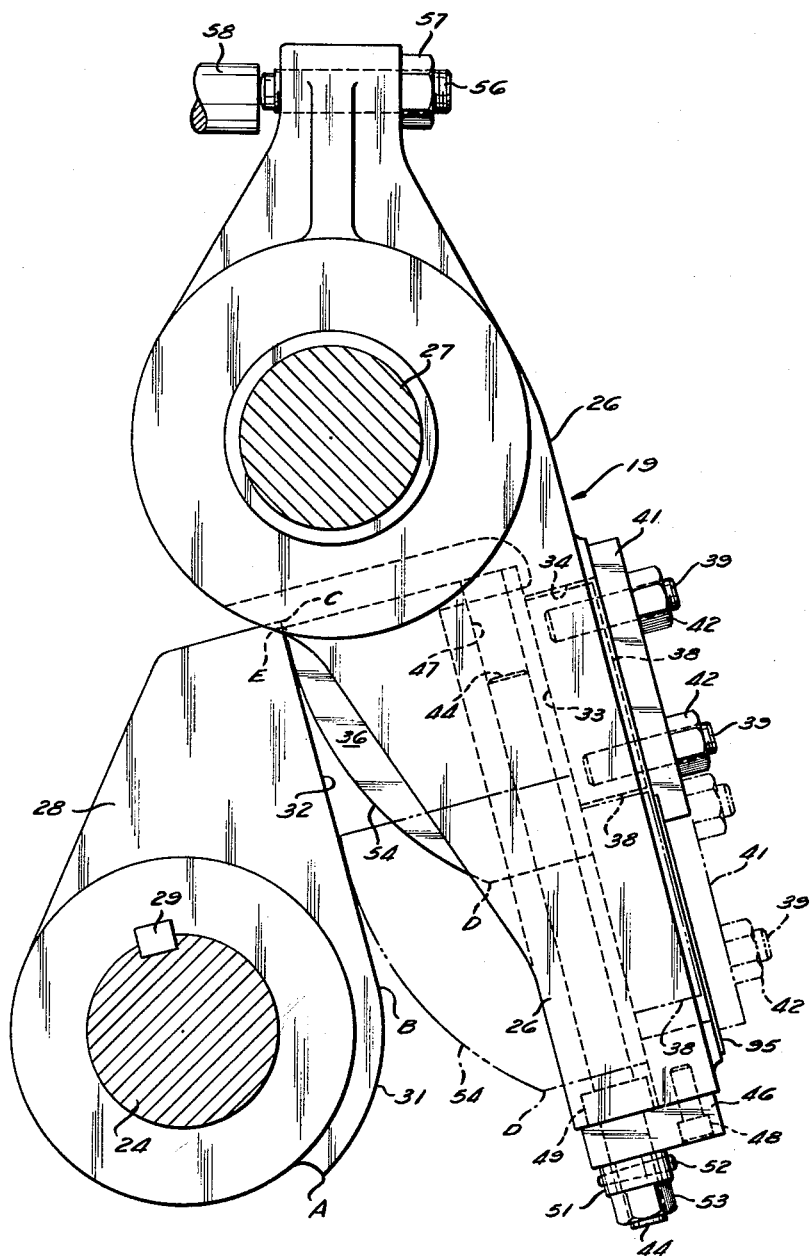
FIGURE 3 is a view simliar to FIGURE 2 illustrating the drive in the position at the completion of knockout operation showing in full line the cam adjusted for the maximum stroke corresponding to the full line position of FIGURE 2 and also illustrating the effect of cam adjustment by the phantom position similar to the phantom position of FIGURE 2.

Referring to FIGURES 2 and 3, a drive cam 28 is mounted on the rocker shaft 24 and fixed against rotation relative thereto by a key 29. In FIGURE 2 the drive cam 28 is illustrated in one extreme position and in FIGURE 3 in the other extreme position, which is the position to which the cam moves at the end of the knockout operation. The drive cam is formed with a dwell camming surface 31 extending from a point A to the point B with uniform radius and a lift portion 32 extending from the point B to the point C. The lift portion 32 is straight and tangentially intersects the dwell portion at B so that the lift portion extends with increasing radius from B to C. Because the lift portion is straight and the dwell portion has a constant radius, the cam can be economically manufactured.

Referring to FIGURE 4, the rocker arm 26 is formed with a pair of parallel guideways 33 on opposite sides of an elongated slot 34. A driven cam 36 is mounted against the guideways 33 and between parallel opposed guide surfaces 37. The driven cam 36 is formed with an elongated projection 38 extending into the elongated slot 34 and provided with two studs 39. A clamping plate 41 is positioned over the studs 39 and is tightened by locking nuts 42 against the rocker arm 26 to lock the driven cam 36 in any desired adjusted position. Thus, the driven cam 36 is laterally located by the opposed guide surfaces 37 and the guideways 33 for adjusting movement and is locked in position by the locking nuts 42.

An adjusting screw 44 extends through an end plate 46 and is threaded into a longitudinally extending bore 47 parallel to the line of adjustment of the driven cam 36. The end plate 46 is mounted on the rocker arm by a bolt 48 and the adjustment screw 44 is axially located relative to the end plate by a shoulder 49 engaging one side of the end plate 46 and a bearing member 51 secured to the adjustment screw 44 by a tapered pin 52 and positioned on the opposite side of the end plate 46. The bearing member 51 is provided with wrench flats 53 so that the adjusting screw 44 can be turned to move the driven cam 36 relative to the rocker arm 26. Adjustment of the driven cam 36 is accomplished by first loosening the locking nuts 42 and then rotating the adjusting screw to move the cam to the desired position. The locking nuts 42 are then retightened to lock the cam.

The driven cam 36 is formed with a camming surface 54 extending from the point D with a smooth convex curve to the point E. The driven cam 36 has a minimum lateral extent at the point D and a maximum lateral extent at the point E. When the cam is adjusted upward to one extreme adjusted position, illustrated in the full line view of FIGURE 2, the driven cam 36 engages the driving cam 28 adjacent to the point D on the driven cam and on the dwell portion 31 of the driving cam. Therefore, the rocker arm 26 assumes the full line position of FIGURE 2.

As the driving cam rotates in a clockwise direction as viewed in FIGURE 2, from the position illustrated, the point of contact between the driven cam 36 and the driving cam 28 moves along the dwell portion toward the point B on the driving cam 28. During such rotation of the driving cam 28, the rocker arm 26 remains stationary since the dwell portion of the driving cam 28 has a constant radius.

When the point B passes under the driven cam 36, the driven cam 36 starts to ride up along the lift portion 32 of the driving cam 28 causing the rocker arm 26 to rotate in a counterclockwise direction for ejection of the workpiece from the dies. The curved form of the cam surface 54 and the increasing effective radius of the drive cam 28 combine with the substantially harmonic motion of the rocker shaft to produce a smooth motion of kick-out.

Rotation continues until the elements assume the full line position of FIGURE 3 which is the extremity of clockwise rotation of the driving cam 28. When this position is reached, the point of contact between the driving cam 28 and the driven cam 36 is adjacent to the point E on the driven cam and the lift portion 32 is parallel to the guideways 33 on the rocker arm. This is the fully kicked or knockout completion position of the rocker arm 26.

Referring again to FIGURE 2, if the driven cam 36 is adjusted to the phantom line position, the driven cam 36 still engages the dwell portion 31 of the driving cam 28 but the engagement of the driving cam 28 with the driven cam 36 is at a point spaced from the point D and closer to the point E. As a result, the adjustment to the phantom line position causes the rocker arm 26 to rotate in a counterclockwise direction to the phantom line position of FIGURE 2. Adjustment of the cam 36, therefore, changes the position of the rocker arm 26 before the kickout.

Referring again to FIGURE 3, the driven cam 36 is illustrated in an adjusted position in the phantom view which is the same adjusted position illustrated in phantom in FIGURE 2. Since the adjustment from the full line to the phantom positions causes the driven cam 36 to move parallel to the guideways 33 and since the guideways are parallel to the lift portion 32 of the driving cam 28 in this position, the adjustment of the cam 36 does not change the operated position of the rocker arm 26. Therefore, it is apparent that adjustment of the driven cam 36 only changes the retracted position of the rocker arm and not the knockout position. It is also apparent that the rocker arm will reach its operated position at the same time in the cycle of the machine since the timing is determined by the movement of the driving cam 28 mounted on the rocker shaft 24. The effective lever radius of the driving cam 28 and the rocker arm 26 remains substantially constant during adjustment so the high breakout force to initiate knockout is provided in all positions of adjustment.

An adjustment screw 56 is threaded through the upper end of the rocker arm 26 and is locked in place by a lock nut 57. The forward end of the adjustment screw 56 engages a rod 58 of the knockout rod assembly 18. Normally the screw 56 is adjusted during the initial manufacturing of the machine to compensate for any slight variations which may be present due to tolerances in the manufacturer of the cams and drive. The adjustment of the screw 56 is normally not changed again until the cams are replaced or are sufficiently worn to require such adjustment.

Figure 5:
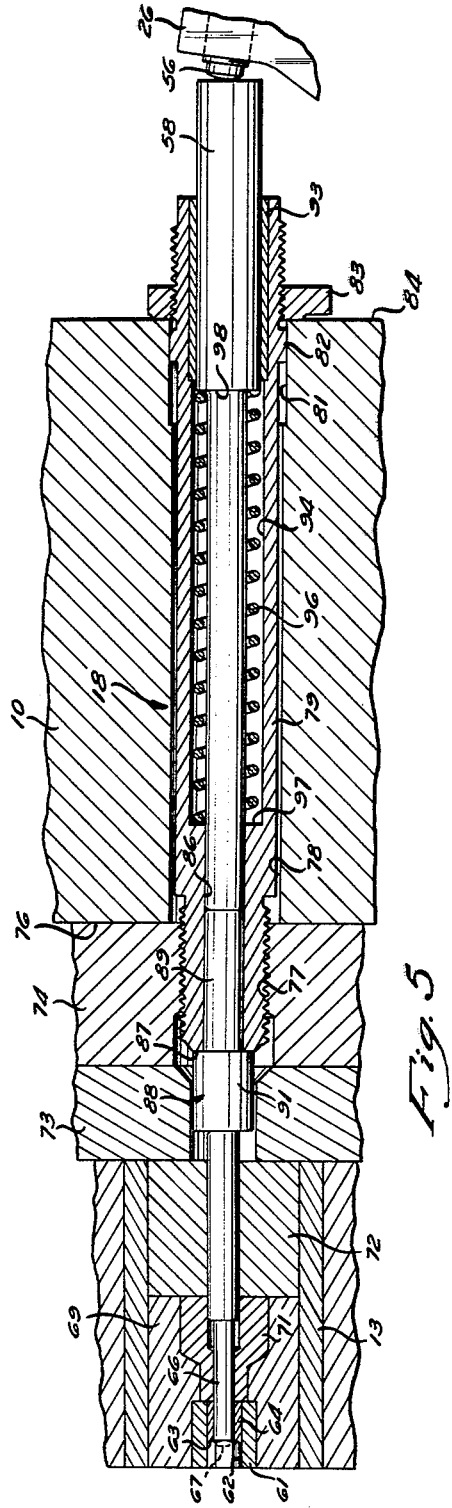
FIGURE 5 is an enlarged fragmentary longitudinal section of the rod assembly illustrating the position of the elements before knockout operation.
Figure 6:
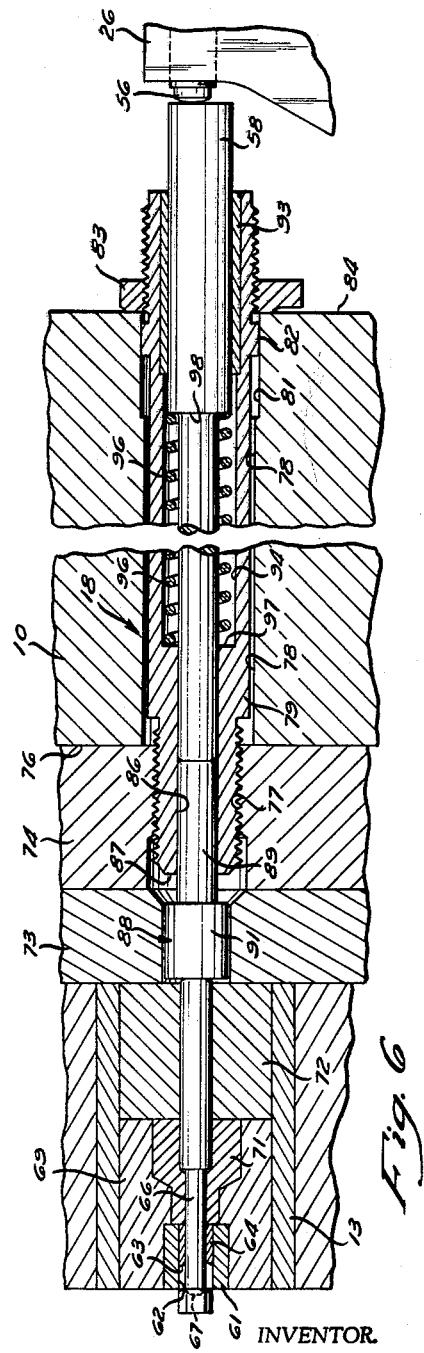
FIGURE 6 is a view similar to FIGURE 5 illustrating the position of the knockout rod assembly at the completion of the knockout operation.

Reference should now be made to FIGURES 5 and 6. The assembly 18 is shown as used in conjunction with dies to form a nut. These dies includes a die sleeve 61 formed with a hexagonal passage 62 which cooperates with an end face 63 on an insert 64 to form a portion of the die cavity. A knockout tool 66 extends through the insert 64 and is formed with a conical nose 67 which provides the remaining surface of the die cavity when the knockout tool is in the rearward position illustrated in FIGURE 5. The dies 61 and 64 are both supported within the die box 13 by a die holder 69 and backup elements 71 and 72. The rearward end of the backup element 72 engages a face plate 73 which is in turn seated against a filler plate 74. The filler plate 74 engages a forward load face 76 on the frame 10. The knockout tool 66 is movable between a rearward extreme position illustrated in FIGURE 5 and a forward operated position illustrated in FIGURE 6. The movement from the rearward to the knockout position is provided to eject the blank formed in the die cavity into the transfer fingers or the like.

The knockout rod assembly 18 serves to support the knockout tool 66 in the rearward position during the upsetting operation. The filler plate 74 is formed with a threaded bore 77 coaxial with the axis of the die and also coaxial with a clearance bore 78 in the frame 10. An adjustment tube 79 extends through the clearance bore 78 and is threaded at its forward end into the threaded bore 77. The rearward end of the clearance bore 78 is formed with a bearing surface 81 engaged by a bearing shoulder 82 on the adjustment tube 79 to laterally support the rearward end of the tube. The lateral support for the forward end is provided by the interengagement of the threads at the forward end. Intermediate the bearing shoulder 82 and the threaded bore 77 clearance is provided between the clearance bore 78 and the adjustment tube 79. A lock nut 83 is threaded onto the rearward end of the adjustment tube 79 and engages the rearward face 84 of the frame 10 to lock the adjustment tube in its adjusted position.

The forward end of the adjustment tube 79 is formed with a first bore 86 and a radial end face 87. A work tip 88 is formed with a stem 89 sliding into the bore 86 with a close fit and a forward head section 91 engageable with the end face 87 to limit rearward movement of the work tip 88. The forward end of the head section 91 engages the rearward end of the knockout tool 66. The knockout tool 66 is therefore prevented from moving in a rearward direction beyond the rearward position illustrated in FIGURE 5. The maximum rearward position of the knockout tool 66 however, can be adjusted by threading the adjustment tube 79 axially relative the filler plate 74.

Because the adjustment tube 79 is threaded into the filler plate at its forward end, any upsetting loads transmitted to the knockout tool 66 are absorbed by the filler plate 74 and transmitted through the forward face 76 into the frame 10. Thus, the upsetting loads on the knockout tool 66 are transmitted to the frame in the same zone as the forming loads applied to the dies 63 and 64. Since the distance to the load absorbing zone of the frame is relatively short, only small deflections of the knockout tool 66 and other load transmitting elements are encountered. This minimizes the deflection problem.

In order to push the work tip 88 forward to produce ejection of the blank from the die cavity, the rod assembly is provided with a push rod 58 guided at its forward end in the bore 86 and at its rearward end in a bushing 93 mounted in the rearward end of the adjustment tube 79. The rearward end of the push rod 58 is engaged by the adjustment screw 56 on the rocker arm 26.

The adjustment tube 79 is formed with a second bore 94 having a diameter larger than the bore 86 to provide clearance for a spring 96 which extends between a shoulder 97 in the tube 79 and a shoulder 98 on the push rod 58. The spring 96 therefore serves to urge the push rod 58 in a rearward direction into engagement with the adjustment screw 56 and biases the rocker arm 26 in a clockwise direction to maintain the cams 28 and 36 in engagement. A small amount of clearance is provided between the forward end of the rod 58 and the rearward end of the work tip 88 so that upsetting forces cannot be transmitted to the knockout drive.

Since the adjustment tube 79 extends through the frame 10 with clearance, it is not necessary to accurately machine the clearance bore 78. This results in substantial savings since the frame 10 is necessarily very bulky and cannot be machined as economically as a flat plate such as the filler plate 74. The lock nut 83 provides a preload of the threads so that there will be no back-lash in the system when the forces of upsetting are transmitted therethrough.

When it is necessary to change the adjustment of the knockout tool as during the set-up of the machine with different dies, the proper work tip 88 for the dies is installed. As discussed previously, the kickout position of the rocker arm 26 is the same regardless of the adjusted position of the drive assembly 19. Therefore the forward end of the push rod 58 always moves to a position relative to the frame 10 illustrated in FIGURE 6 at the completion of knockout. The length of the work tip 88 and knockout tool 66 is chosen so that the blank will be ejected to the required position.

The adjusting tube is adjusted until the tool 66 is properly positioned in its rearward position during the working phase of the cycle. This is accomplished by merely loosening the nut 83 and turning the tube 79 until proper adjustment is provided. The nut 83 is then tightened to lock the tube 79. Then the driven cam 36 is adjusted to provide the slight clearance between the forward end of the push rod 58 and the rearward end of the work tip 88. This provides the proper stroke of the knockout drive since the adjustment of the driven cam 26 does not change the knockout position. A scale 95 calibrated to show knockout stroke is provided on the rocker arm 26 to assist in this adjustment.

Figure 7:
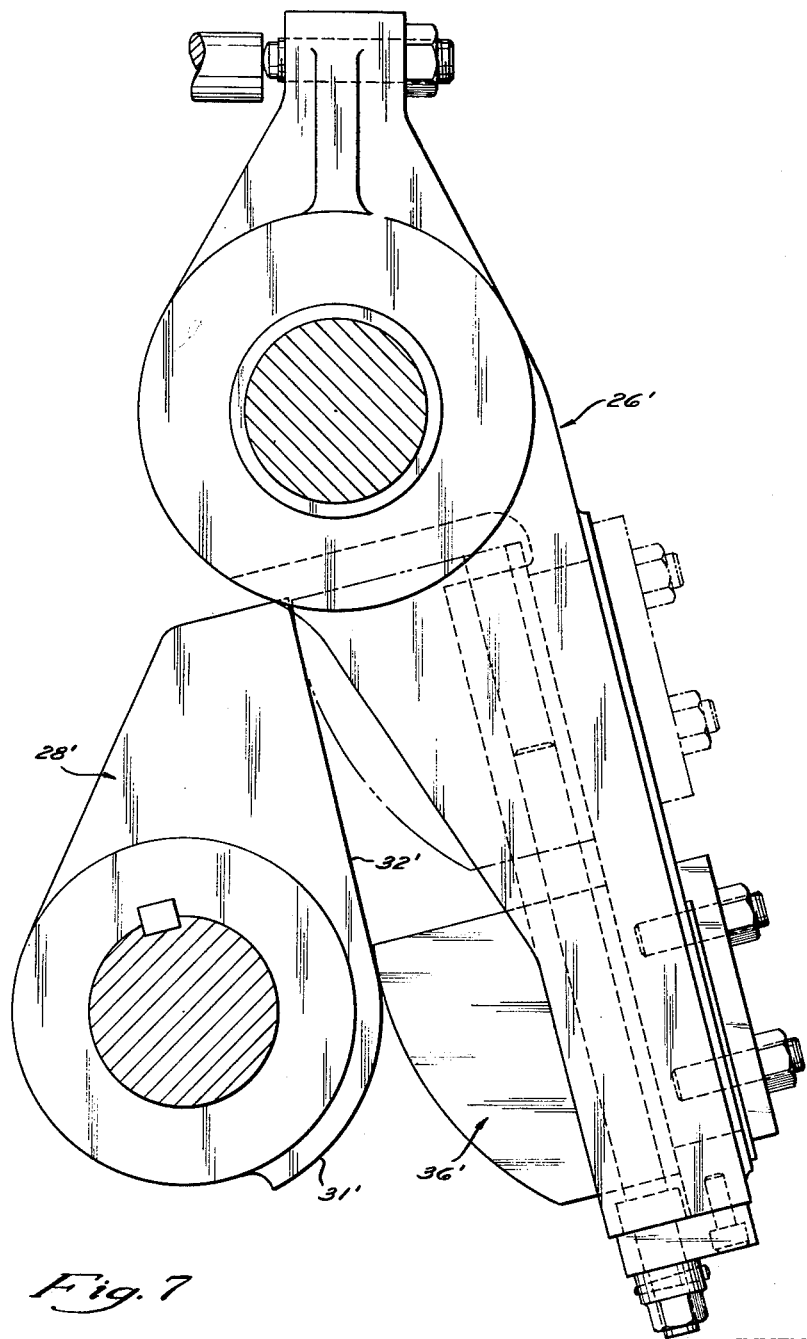
FIGURE 7 is an enlarged fragmentary view of a modified knockout drive adjustable through a range from a zero kickout stroke to a full kickout stroke.

In FIGURE 7 a modified structure is illustrated wherein the knockout drive is infinitely adjustable between a zero kickout stroke and a full kickout stroke. This structure embodies the same elements as shown in FIGURES 2 and 3 but the proportions have been changed to permit adjustment to a zero kickout position. Similar reference numerals are used to designate similar parts with a prime (') added to indicate that they refer to the structure of FIGURE 7.

In this form of kickout drive, the lower end of the rocker arm 26' is longer and the length of adjustment of the driven cam 36' is increased so that the driven cam can be adjusted to the illustrated position. When the driven cam 36' is in this illustrated position, it contacts the dwell portion 31' at its intersection with the lift portion 32' when the drive cam 28' is in its extreme of clockwise rotation. Therefore, the rocker arm 26' is not moved as the driven cam 28' oscillates. As the driven cam 36' is adjusted upwardly, it engages higher points on the lift portion 32' and as a result, produces greater kickout strokes. When this full adjustment is provided, the dwell portion 31' is formed to extend around the axis of the shaft 24' through an angle at least equal to the angle of oscillation of the driven cam 28'.

A machine for forming blanks incorporating this invention has, among its advantages, simple adjustment, low manufacturing costs and low maintenance costs. The adjustments are all easily accessible and easily made so the machine set-up time is minimized. The cams are formed so that high loadings are not produced at particular points on the cam so that uniform wear occurs, eliminating costly replacement or repair expenses. This flexibility of adjusting enables the machine incorporating the invention to be used in a variety of manufacturing processes merely by substituting the required dies and making the necessary adjustments. The provision of knockout means at each die station also provides flexibility by providing a knockout system at any die station required by the process of manufacture being performed.

Although a preferred embodiment of this invention is illustrated, it is to be understood that various modifications and rearrangements of parts may be resorted to without departing from the scope of the invention as defined in the following claims.

What is claimed is:

1. A knockout drive for forming machines comprising a base, a power driven rocker shaft member journaled on said base for oscillating movement relative thereto between first and second positions, a lever member journaled on said base for pivotal oscillating movement, a first cam on one of said members formed with a straight cam surface of increasing radius, an adjustable cam on the other of said members having a curved camming surface engaging said straight surface when said rocker shaft is in said second position, and adjustment means mounting said adjustable cam on said other member for movement relative thereto along a line of adjustment parallel to said straight cam surface when said rocker shaft is in said second position whereby the position said lever member assumes when said rocker shaft is in said second position remains unchanged by adjustment of said adjustable cam.

2. A knockout drive for forming machines comprising a base, a rocker shaft mounted on said base for pivotal oscillating movement relative thereto between first and second positions, a knockout lever journaled on said base, a first cam on said rocker shaft formed with a straight lift surface of increasing radius, a second cam on said knockout lever having a curved camming surface engaging said lift surface when said rocker shaft is in said second position, and adjustment means mounting said second cam on said knockout lever for movement relative thereto along a line of adjustment parallel to said lift surface when said rocker shaft is in said second position.

3. A knockout drive for forming machines comprising a base, a rocker shaft mounted on said base for pivotal oscillating movement relative thereto between first and second positions, a knockout lever journaled on said base, a first cam on said rocker shaft formed with a dwell surface of constant radius and a straight lift surface of increasing radius, a second cam on said knockout lever having a curved convex camming surface engaging said dwell surface when said rocker shaft is in said first position and engaging said lift surface when said rocker shaft is in said second position, and adjustment means mounting said second cam on said knockout lever for movement relative thereto along a line of adjustment parallel to said lift surface when said rocker shaft is in said second position.

4. A knockout drive for forming machines comprising a frame, a slide reciprocable on said frame, a crank and pitman drive connected to reciprocate said slide, a forming die on said frame adapted to form workpieces, a rocker shaft journaled on said frame for pivotal oscillating movement relative thereto, means connecting said drive and rocker shaft moving the latter between first and second positions in timed relationship to slide movement, a knockout lever journaled on said base, first and second cams on said rocker shaft and rocker arm, said first cam having a straight lift surface of increasing radius, said second cam having a curved convex camming surface engaging said lift surface when said rocker shaft is in said second position, adjustment means mounting said second cam for movement along a line of adjustment parallel to said lift surface when said rocker shaft is in said second position, and knockout means driven by said knockout lever adapted to eject workpieces from said forming die in response to movement of said rocker shaft to said second position.

5. A knockout drive for forming machines comprising a frame, a rocker shaft journaled on said frame for oscillating rotation between first and second positions, a rocker arm journaled on said frame for pivotal oscillating movement, a drive cam fixed to said rocker shaft and formed with a dwell portion of constant radius and a straight lift portion tangentially intersecting said dwell portion and extending therefrom with increasing radius, a driven cam mounted on said rocker arm for adjusting movement relative thereto along a straight line, said driven cam being formed with a curved camming surface engaging said dwell portion when said rocker shaft is in said first position and engaging said lift portion when said rocker shaft is in said second position, said lift portion being parallel to said straight line of adjustment when said rocker shaft is in said second position.

6. A knockout drive for forming machines comprising a frame, a rocker shaft journaled on said frame for oscillating rotation between first and second positions, a rocker arm journaled on said frame for pivotal oscillating movement, a drive cam fixed to said rocker shaft and formed with a dwell portion of constant radius and a straight lift portion extending therefrom with increasing radius, a driven cam mounted on said rocker arm for adjusting movement relative thereto along a straight line, screw means connected between said rocker arm and driven cam rotatable to adjust said driven cam relative to said rocker arm, lock means operating to lock said driven cam relative to said rocker arm in its adjusted position, said driven cam being formed with a camming surface engaging said dwell portion when said rocker shaft is in said first position and engaging said lift portion when said rocker shaft is in said second position, said lift portion being parallel to said straight line of adjustment when said rocker shaft is in said second position.

7. A knockout drive for forming machines comprising a frame, a rocker shaft member journaled on said frame for oscillating motion between a first position and a second position, a rocker arm member journaled on said frame for oscillating motion relative thereto, a knockout rod assembly guided in said frame for reciprocation from a rearward position to a forward knockout position, said rocker arm member engaging said rod assembly causing reciprocation thereof in response to oscillation of said rocker arm member, a pair of cams one on each of said rocker shaft member and said rocker arm member, one of said cams being formed with a straight lift portion of increasing radius, the other of said cams being formed with a curved cam surface engaging said one cam causing oscillation of said rocker arm member under the influence of oscillation of said rocker shaft member, said other cam being mounted on its associated member for adjusting movement relative thereto along a straight line of adjustment, said line of adjustment being parallel to said lift portion when said rocker shaft is in said second position whereby adjustment of said second cam changes only the rearward position of said rod assembly.

8. A knockout drive for forming machines comprising a frame, a rocker shaft journaled on said frame for oscillating motion between a back position and an operated position, a rocker arm journaled on said frame for oscillating motion relative thereto, a knockout rod assembly guided in said frame for reciprocation from a rearward position to a forward knockout position, said rocker arm engaging said rod assembly causing reciprocation thereof in response to oscillation of said rocker arm, a first cam on said rocker shaft formed with a dwell portion of uniform radius and a straight lift portion extending therefrom, a second cam on said rocker arm engaging said first cam causing oscillation of said rocker arm under the influence of oscillation of said rocker shaft, said second cam being mounted on said rocker arm for adjusting movement relative thereto along a straight line of adjustment, said second cam being formed with a curved surface extending to a surface of maximum lift engaging said first cam whenever said rocker shaft is in said operated position, said line of adjustment being parallel to said lift portion when said rocker shaft is in said operated position whereby adjustment of said second cam changes only the rearward position of said rod assembly.

9. In a machine of the character described, a frame assembly, a slide assembly reciprocable on said frame assembly, a drive connected to reciprocate said slide assembly through a predetermined cycle, a work station including cooperating dies and tools in said frame and slide assemblies operating to form workpieces, ejector means slidable in one of said assemblies and operable to engage and eject a formed workpiece from said work station, a rocker shaft pivoted on said one assembly, means connecting said rocker shaft and drive oscillating said rocker shaft about its pivot between first and second positions in a timed relationship to the movement of said assembly, a rocker arm pivoted on said one assembly for oscillating movement relative thereto, a drive cam mounted on said rocker shaft, a driven cam mounted on said rocker arm, one of said cams including a straight lift portion of increasing radius, the other of said cams engaging said lift portion when said rocker shaft is in said second position, the mounting of said other cam being adjustable along a straight line, said lift portion being parallel to said straight line of adjustment of said other cam when said rocker shaft is in said second position, said rocker arm operating said ejector means to eject said workpiece in response to movement of said rocker shaft to said second position.

10. In a machine of the character described, a frame assembly, a slide assembly reciprocable on said frame assembly, a drive connected to reciprocate said slide assembly through a predetermined cycle, a work station including cooperating dies and tools in said frame and slide assemblies operating to form workpieces, ejector means slidable in one of said assemblies and operable to engage and eject a formed workpiece from said work station, a rocker shaft pivoted on said one assembly, means connecting said rocker shaft and drive oscillating said rocker shaft about its pivot between first and second positions in a timed relationship to the movement of said slide assembly, a rocker arm pivoted on said one assembly for oscillating movement relative thereto, a drive cam fixed on said rocker shaft, a driven cam mounted on said rocker arm for adjusting movement along a straight line, said drive cam including a dwell portion of constant radius and a straight lift portion of increasing radius, said driven cam engaging said dwell portion when said rocker shaft is in said first position and engaging said lift portion when said rocker shaft is in said second position, said lift portion being parallel to said straight line of adjustment of said driven cam when said rocker shaft is in said second position, said rocker arm operating said ejector means to eject said workpiece in response to movement of said rocker shaft to said second position.

11. In a machine of the character described, a frame, a slide reciprocable on said frame, a drive connected to reciprocate said slide through a predetermined cycle, a work station including cooperating dies and tools in said frame and slide operating to form workpieces, ejector means slidable in said frame and operable to engage and eject a formed workpiece from said work station, a rocker shaft pivoted on said frame, means connecting said rocker shaft and drive oscillating said shaft about its pivot between first and second positions in a timed relationship to the movement of said slide, a rocker arm pivoted on said frame for oscillating movement relative thereto, a drive cam fixed on said rocker shaft, a driven cam mounted on said rocket arm for adjusting movement along a straight line, said drive cam including a dwell portion of constant radius and a straight lift portion of increasing radius, said driven cam engaging said dwell portion when said rocker shaft is in said first position and engaging said lift portion when said rocker shaft is in said second position, said lift portion being parallel to said straight line of adjustment of said driven cam when said rocker shaft is in said second position, said rocker arm operating said ejector means to eject said workpiece in response to movement of said rocker shaft to said second position.

12. A knockout rod assembly for forming machines comprising a frame having a load face, forming dies forward of said load face, a knockout drive on said frame rearward of said load face, a plate seated against said load face transmitting forming forces from said dies to said load face, a threaded bore in said plate, a clearance bore in said frame coaxial with said threaded bore and extending to a rearward end of said frame adjacent said knockout drive, an adjustment tube extending through said clearance bore and threaded at its forward end into said threaded bore, said tube being formed with a radially extending load surface at its forward end, rod means laterally supported by said tube and axially slidable therealong operable to eject workpieces from said dies, and a shoulder on said rod means engaging said load surface preventing rearward movement of said rod means beyond a predetermining rearward position, said knockout drive operating to push said rod means forward from said rearward position to eject workpieces from said dies.

13. A knockout rod assembly for forming machines comprising a frame having a load face, forming dies forward of said load face, a load member seated against said load face transmitting forming forces in said dies to said load face, a threaded bore in said load member, a tube threaded into said threaded bore and having a radially extending load surface at its forward end, rod means slidable in said tube for axial movement therealong, a shoulder on said rod means engaging said load surface preventing rearward movement of said rod means beyond a predetermined rearward position, and power means operable to move said rod means forward from said rearward position to eject workpieces from said dies.

14. In a machine of the character described, a frame formed with a load face, die means adapted to form workpieces, ejector means movable forward relative to said die means to eject workpieces therefrom, a load member mounted between said die means and load face transmitting forming loads in said dies to said load face, power knockout means operably connected to move said ejector means forward, and back-up means adjustably threaded into said load member engageable with said ejector means adjustably limiting rearward movement thereof.

15. In a machine of the character described, a frame formed with a load face, die means adapted to form workpieces, a filler plate mounted between said die means and load face transmitting forming loads in said dies to said load face, an adjustment tube extending through said frame and threaded for adjustment into said filler plate, lock means operable to lock said adjustment tube against movement relative to said filler plate, ejector means extending through said adjustment tube movable forward to eject workpieces from said die means, power knockout means operably connected to move said ejector means forward for ejection, and interenegageable stops forward of said load face on said ejector means and adjustment tube preventing rearward movement of said ejector means relative to said adjustment tube beyond a predetermined position.

16. A knockout rod assembly for forming machines comprising a frame having a load face, a filler plate mounted against said load face, a forming die carried by said frame and supported against forming loads by said filler plate, a threaded bore in said filler plate aligned with said die, a clearance bore in said frame aligned with said threaded bore, a tubular back-up member extending with clearance through said clearance bore and threaded at its forward end into said threaded bore, a push rod assembly axially slidably in said back-up member with its forward end forward of the forward end of said back-up member and its rearward end extending beyond the rearward end thereof, power means operable to reciprocate said push rod assembly relative to said frame, said push rod assembly and back-up member being formed with interengagable load surfaces adjacent to said filler plate operable to limit rearward movement of the forward end of said push rod assembly relative to said back-up member beyond a predetermined rearward position, and ejector means associated with said die operated by forward movement of said push rod assembly from said rearward position to eject workpieces therefrom.

17. A knockout rod assembly for forming machines comprising a frame having a load face, a filler plate mounted against said load face, a forming die carried by said frame and supported against forming loads by said filler plate, a threaded bore in said filler plate aligned with said die, a clearance bore in said frame aligned with said threaded bore, a tubular back-up member extending with clearance through said clearance bore and threaded at its forward end into said threaded bore, a push rod axially slidably in said back-up member with its forward end spaced back from the forward end of said back-up member and its rearward end extending beyond the rearward end thereof, power means operable to reciprocate said push rod relative to said frame, a work tip extending into the forward end of said back-up member, said work tip and back-up member being formed with interengageable load surfaces operable to limit rearward movement of said work tip relative to said back-up member beyond a predetermined rearward position, and ejector means associated with said die operated by forward movement of said work tip to eject work pieces therefrom, forward reciprocation of said push rod under the influence of said power means causing said push rod to engage said work tip and move it forward.

18. A knockout drive for forming machines comprising a base, a rocker shaft mounted on said base for pivotal oscillating movement relative thereto through a predetermined angle between first and second positions, a knockout lever journaled on said base, a drive cam on said rocker arm formed with a uniform radius dwell portion and a straight lift portion of increasing radius, a driven cam on said knockout lever formed with a curved camming surface engaging said drive cam, and adjustment means mounting said driven cam on said knockout lever for movement relative thereto along a line of adjustment parallel to said lift portion when said drive cam is in said second position; adjustment of said driven cam to one position causing said driven cam to engage said dwell portion when said drive cam is in both said first and second positions; adjustment of said driven cam to other positions causing said driven cam to engage said lift portion when said drive cam moves to said second position; said dwell portion extending around said rocker shaft through an angle at least as great as said predetermined angle.

19. A knockout drive for forming machines comprising a base, a rocker shaft mounted on said base for pivotal oscillating movement relative thereto through a predetermined angle between first and second positions, a knockout lever journaled on said base, a drive cam on said rocker arm formed with a uniform radius dwell portion and a straight lift portion of increasing radius tangentially intersecting said dwell portion, a driven cam on said knockout lever formed with a curved camming surface engaging said drive cam, and adjustment means mounting said driven cam on said knockout lever for movement relative thereto along a line of adjustment parallel to said lift portion when said drive cam is in said second position; adjustment of said driven cam to one position causing said driven cam to engage the intersection of said dwell portion and lift portion when said drive cam is in said second position; adjustment of said driven cam to other positions causing said driven cam to engage said lift portion when said drive cam moves to said second position; said dwell portion extending around said rocker shaft through an angle at least as great as said predetermined angle.

20. In a machine of the character described a base, a rocker shaft mounted on said base for pivotal oscillating movement relative thereto between first and second positions, a knockout lever journaled on said base, a first cam on said rocker shaft formed with a straight lift surface of increasing radius, a second cam on said knockout lever having a curved camming surface engaging said lift surface when said rocker shaft is in said second position, and adjusting means mounting said second cam on said knockout lever for movement relative thereto along a line of adjustment parallel to said lift surface when said rocker shaft is in said second position; a load face on said base, die means adapted to form work pieces, ejector means movable forward relative to said die means to eject work pieces therefrom, a load member mounted between said die means and load face transmitting forming loads in said dies to said load face, power knockout means engageable with said knockout lever operable to move said ejector means forward to a predetermined position when said rocker shaft is moved to said second position, and back up means adjustably threaded into said load member engageable with said ejector means adjustably limiting the reaward movement thereof.

References Cited in the file of this patent
UNITED STATES PATENTS

| | | |
|---|---|---|
| 1,592,060 | Wilcox | July 13, 1926 |
| 2,005,495 | Clouse | June 18, 1935 |
| 2,057,418 | Clouse | Oct. 13, 1936 |
| 2,396,995 | Freedman | Mar. 19, 1946 |
| 2,547,304 | Broscomb | Apr. 3, 1951 |
| 2,758,322 | Schaefer | Aug. 14, 1956 |

UNITED STATES PATENT OFFICE
CERTIFICATE OF CORRECTION

Patent No. 3,171,144                            March 2, 1965

John A. Maistros

It is hereby certified that error appears in the above numbered patent requiring correction and that the said Letters Patent should read as corrected below.

Column 9, line 6, after "said" insert -- slide --; column 12, line 40, for "reaward" read -- rearward --.

Signed and sealed this 27th day of July 1965.

(SEAL)
Attest:

ERNEST W. SWIDER                                  EDWARD J. BRENNER
Attesting Officer                                          Commissioner of Patents